United States Patent
Nguyen et al.

(10) Patent No.: US 10,848,290 B2
(45) Date of Patent: Nov. 24, 2020

(54) CHANNEL STATE INFORMATION RELATED FEEDBACK REPORTING AND CHANNEL STATE INFORMATION ACQUISITION

(71) Applicant: Huawei Technologies Co., Ltd., Shenzhen (CN)

(72) Inventors: Van Minh Nguyen, Boulogne Billancourt (FR); Merouane Debbah, Boulogne Billancourt (FR); Marco Maso, Boulogne Billancourt (FR)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/692,716

(22) Filed: Nov. 22, 2019

(65) Prior Publication Data
US 2020/0119779 A1    Apr. 16, 2020

Related U.S. Application Data

(63) Continuation of application No. PCT/EP2017/062377, filed on May 23, 2017.

(51) Int. Cl.
*H04L 5/00* (2006.01)
*H04B 7/06* (2006.01)
(Continued)

(52) U.S. Cl.
CPC ......... *H04L 5/0053* (2013.01); *H04B 7/0417* (2013.01); *H04B 7/0626* (2013.01);
(Continued)

(58) Field of Classification Search
CPC ....... H04L 1/20; H04L 1/0002; H04L 1/0009; H04L 5/0057; H04L 5/0224; H04B 17/21; H04B 7/0417; H04B 7/0626; H04B 7/063
See application file for complete search history.

(56) References Cited

U.S. PATENT DOCUMENTS

2009/0276674 A1* 11/2009 Wei .......................... H04L 1/16
714/749
2011/0176624 A1    7/2011 Annavajjala et al.
(Continued)

FOREIGN PATENT DOCUMENTS

WO        2014163451 A1    10/2014

OTHER PUBLICATIONS

Choi et al., "Interpolation BasedTransmit Beamforming for MIMO-OFDM With Limited Feedback," IEEE Transactions on Signal Processing, vol. 53, No. 11, XP011141126, pp. 4125-4135, Institute of Electrical and Electronics Engineers, New York, New York (Nov. 2005).

(Continued)

*Primary Examiner* — Khanh C Tran
(74) *Attorney, Agent, or Firm* — Leydig, Voit & Mayer, Ltd.

(57) ABSTRACT

An apparatus reports feedback messages for channel state information estimation with respect to a channel between a first antenna of a first device and a second antenna of a second device. The apparatus is configured to determine a frequency response across a predetermined bandwidth of the channel between the first antenna and the second antenna, sample a phase of the determined frequency response in order to obtain a number of samples of the phase of the determined frequency response, and send to a further apparatus at least a first feedback message including information of at least a subset of the obtained samples.

17 Claims, 7 Drawing Sheets

(51) Int. Cl.
   *H04W 72/08* (2009.01)
   *H04B 7/0417* (2017.01)
(52) U.S. Cl.
   CPC .......... *H04L 5/0051* (2013.01); *H04L 5/0057* (2013.01); *H04W 72/085* (2013.01)

(56) References Cited

U.S. PATENT DOCUMENTS

| | | | | |
|---|---|---|---|---|
| 2012/0213111 | A1* | 8/2012 | Shimezawa | H04B 7/063 370/252 |
| 2012/0213261 | A1* | 8/2012 | Sayana | H04L 5/0048 375/224 |
| 2013/0201912 | A1* | 8/2013 | Sheng | H04B 7/0413 370/328 |
| 2015/0373736 | A1 | 12/2015 | Ji et al. | |
| 2016/0050007 | A1 | 2/2016 | Lee et al. | |
| 2016/0072562 | A1* | 3/2016 | Onggosanusi | H04B 7/0478 370/329 |
| 2016/0142115 | A1* | 5/2016 | Onggosanusi | H04B 7/0456 370/252 |
| 2016/0156397 | A1* | 6/2016 | Onggosanusi | H04B 7/0456 |
| 2019/0312615 | A1* | 10/2019 | Wu | H04B 7/063 |

OTHER PUBLICATIONS

Jiang et al., "Achievable Rates of FDD Massive MIMO Systems With Spatial Channel Correlation," IEEE Transactions on Wireless Communications, vol. 14, No. 5, pp. 2868-2882, Institute of Electrical and Electronics Engineers, New York, New York (May 2015).

Sudarshan et al., "Channel Statistics-Based RF Pre-Processing with Antenna Selection," IEEE Transactions on Wireless Communications, vol. 5, No. 12, pp. 3501-3511, Institute of Electrical and Electronics Engineers, New York, New York (Dec. 2006).

Hong et al., "Spatial Multiplexing in Correlated Fading via the Virtual Channel Representation," IEEE Journal on Selected Areas of Communication, vol. 21, No. 5, pp. 856-866, Institute of Electrical and Electronics Engineers, New York, New York (Jun. 2003).

Adhikary et al., "Joint Spatial Division and Multiplexing—The Large-Scale Array Regime," IEEE Transactions on Information Theory, vol. 59, No. 10, pp. 6441-6463, Institute of Electrical and Electronics Engineers, New York, New York (Oct. 2013).

Chen et al., "Two-Tier Precoding for FDD Multi-Cell Massive MIMO Time-Varying Interference Networks," IEEE Journal on Selected Areas of Communication, vol. 32, No. 6, pp. 1230-1238, Institute of Electrical and Electronics Engineers, New York, New York (Jun. 2014).

Nam et al., "Joint Spatial Division and Multiplexing: Realizing massive MIMO gains with limited channel state information," 2012 46th Annual Conference on Information Sciences and Systems (CISS), Princeton, NJ, pp. 1-6, Institute of Electrical and Electronics Engineers, New York, New York (Mar. 21-23, 2012).

Liu et al., "Phase Only RF Precoding for Massive MIMO Systems with Limited RF Chains," IEEE Transactions on Signal Processing, vol. 62, No. 17, pp. 4505-4515, Institute of Electrical and Electronics Engineers, New York, New York (Sep. 2014).

Chang et al, "Ultrawideband Transceiver Design Using Channel Phase Precoding," IEEE Transactions on Signal Processing, vol. 55, No. 7, pp. 3807-3822, Institute of Electrical and Electronics Engineers, New York, New York (Jul. 2007).

Zhuang et al., "Phase Precoding for Frequency-Selective Rayleigh and Rician Slowly Fading Channels," IEEE Transactions on Vehicular Technology, vol. 46, No. 1, pp. 129-142, Institute of Electrical and Electronics Engineers, New York, New York (Feb. 1997).

Molisch et al., "FFT-Based Hybrid Antenna Selection Schemes for Spatially Correlated MIMO Channels," IEEE Communications Letters, vol. 8, No. 1, pp. 36-38, Institute of Electrical and Electronics Engineers, New York, New York (Jan. 2004).

\* cited by examiner

CHANNEL STATE INFORMATION RELATED FEEDBACK REPORTING AND CHANNEL STATE INFORMATION ACQUISITION

CROSS-REFERENCE TO RELATED APPLICATIONS

This application is a continuation of International Application No. PCT/EP2017/062377, filed on May 23, 2017, the disclosure of which is hereby incorporated by reference in its entirety.

TECHNICAL FIELD

The present invention relates to the field of wireless communications, and more particularly to channel state information acquisition and reporting in multi-antenna systems.

BACKGROUND

The use of large antenna arrays, such as massive multiple input multiple output (MIMO) systems, is a very promising technique in order to increase the performance of a cellular system.

Many current networks are populated by multi antenna devices (like in MIMO systems). Realizations of this transceiver paradigm can be found, for instance, in WiFi or LTE networks. In such contexts, MIMO has the potential to leverage a sufficient number of degrees of freedom to transmit multiple data streams to several users using the same radio resources. In general, this is made possible by the adoption of methods by means of which the transmitter pre-adapts the transmit signal to the channel impulse response, i.e., precoding techniques. Also called equalizer at the transmitter side, or pre-equalizer, precoding is a fundamental aspect of approaches such as spatial multiplexing, beamforming, or multi-user MIMO. Thus, the role of precoding is fundamental to fully exploit the potential of a MIMO system in terms of multiplexing capabilities. In practice, a MIMO base station (BS) can reduce the negative effect of inter-stream/multi-user interference and small-scale fading in multi-user MIMO (MU MIMO) systems, and largely improve their performance. Popular examples of precoding strategies are the so-called matched filter (MF), channel inversion or zero-forcing (ZF), and regularized zero-forcing (RZF).

However, to precode a signal, the transmitter should know the channel response towards one or more users, also called channel state information at the transmitter side (CSIT).

When the antenna array is relatively small, a direct feedback of CSI from the receiver can be provided to the transmitter. However, when the antenna array becomes large, the direct CSI feedback becomes hardly feasible in a massive MIMO system. In these cases, CSIT can be obtained in two ways:
1. By exploiting the channel reciprocity—this is possible, e.g., in time division duplex (TDD) systems;
2. By receiving feedback from user equipment (UE) devices—this is done, e.g., in conventional MIMO settings, in frequency division duplexing (FDD) systems.

The CSIT acquisition problem is particularly challenging in the second case. In this regard, it should however be noted that, as opposed to TDD systems, FDD systems have the advantage of not requiring precise calibration to yield positive results, provided that accurate CSIT is available. Additionally, many modern cellular systems that offer multi-user MIMO support (e.g., according to the LTE/LTE-A standards) operate in FDD.

Thus, the identification of an effective solution for acquiring accurate and timely CSIT in FDD MIMO systems is widely considered a fundamental problem that needs to be efficiently solved, in order for cellular and wireless networks to keep the pace with the market evolution.

The conventional technique to acquire CSIT in a feedback-based system, e.g., FDD, is typically divided in two main phases:
1. Transmission of a pilot sequence in the downlink, so that each user can estimate a respective downlink channel;
2. Feedback of this channel estimation in the uplink by the scheduled users for the transmission in the next slot.

In practice, the reliability of CSIT acquired through uplink (UL) feedback messages is very hard to guarantee if very tight time constraints need to be satisfied. The length of the downlink training sequence and the size of the data to be fed back per user grow linearly with the size of the antenna arrays at both ends of the communication. Thus, the time needed to perform the feedback procedure can become large for big arrays. The CSI acquisition overhead increases linearly with the overall number of antennas in the system. In practical systems, the channels stay (approximately) the same only for a fixed amount of time, i.e., its coherence time, whose duration strongly depends on how often the surrounding environment changes or how fast UE devices move. Accordingly, channels need to be periodically re-estimated in order for the CSIT to be timely and accurate. Hence, if the time spent for CSI acquisition grows large, little time is left to transmit data to the users before the channels change. This reduces the feasibility of precoding strategies, which in turn decreases the achievable gains deriving from the feature of having a large array. As a consequence, CSI feedback is indeed a big bottleneck for the performance of state-of-the-art implementations of FDD large MIMO systems, for example, massive MIMO systems.

Several conventional solutions for precoding and CSIT acquisition in FDD MU MIMO systems are known and are hereafter presented.

For a codebook-based precoding, the BS selects a precoding codeword from a pre-configured codebook. One or more UE devices provides feedback channel quality indicators (e.g., Rank, signal-to-noise ratio (SNR)) to the BS. Document U.S. 2015/0373736 A1 discloses a device for transmitting a channel state information reference signal for applying codebook based precoding. Document WO 2014/163451 A1 discloses a method and an apparatus for supporting multiple users by using a massive MIMO technique in a FDD environment that is also applying codebook-based precoding.

For precoding using channel statistics, a precoding codeword selection is performed, wherein the channel correlation is assumed to be perfectly known to the transmitter and a codeword is appropriately selected from a pre-constituted codebook. The channel correlation is used to select a subset of antennas for transmission towards one or more UE devices for RF pre-processing. Precoding using channel statistics is disclosed, for instance, by Z. Jiang, A. F. Molisch, G. Caire and Z. Niu, "Achievable Rates of FDD Massive MIMO Systems With Spatial Channel Correlation," in IEEE Trans. Wirel. Commun., vol. 14, no. 5, pp. 2868-2882, May 2015 or by P. Sudarshan, N. B. Mehta, A. F. Molisch and J. Zhang, "Channel statistics-based RF pre-processing with antenna selection," in IEEE Trans. Wirel. Commun., vol. 5, no. 12, pp. 3501-3511, December 2006.

For a precoding without channel statistics, a unitary precoding is carried out, wherein the adopted precoding matrix at the BS is set to a certain unitary matrix, which is selected in order to optimize a performance criteria. This approach is disclosed, for instance, by Z. Hong, K. Liu, R. W. Heath and A. M. Sayeed, "Spatial multiplexing in correlated fading via the virtual channel representation," in IEEE JSAC, vol. 21, no. 5, pp. 856-866, June 2003.

For a precoding with low CSI feedback, a two-stage precoding is applied. The adopted precoding matrix is made of two components. The outer-component offers space division and user grouping properties, whereas the inner-component serves legacy multi-user interference mitigation purposes, e.g., zero-forcing (ZF). Such a precoding with low CSI feedback is described by A. Adhikary, J. Nam, J. Y. Ahn and G. Caire, "Joint spatial division and multiplexing—the large-scale array regime," in IEEE Trans. Inf. Theory, vol. 59, no. 10, pp. 6441-6463, October 2013 or by J. Chen and V. K. N. Lau, "Two-tier precoding for FDD multi-cell massive MIMO time-varying interference networks," in IEEE JSAC, vol. 32, no. 6, pp. 1230-1238, June 2014.

As can be seen from the above, CSI feedback is required for all precoding approaches. Thus, there is a need for an enhanced and efficient CSI determination, reporting, and acquisition requiring a low amount of data to be transmitted.

SUMMARY

The present application provides for an enhanced signaling and acquiring of channel state information.

According to a first aspect, the present application provides an apparatus for reporting feedback messages for channel state information (CSI) estimation with respect to a channel between a first antenna of a first device and a second antenna of a second device. The apparatus is configured to determine a frequency response across a predetermined bandwidth of the channel between the first antenna and the second antenna, sample a phase of the determined frequency response in order to obtain a number of samples of the phase of the determined frequency response, and send to a further apparatus at least a first feedback message including information of at least a subset of the obtained samples.

Thereby, the apparatus can provide feedback messages related to a channel state information (CSI) of a communication channel in an efficient manner. In particular, the present application takes into account that a precoding can be performed on the basis of the phase information. Hence, it is sufficient to provide CSI including information about the phase of a frequency response. In this way, the amount of details in the feedback message related to the CSI can be reduced. In addition, the information about to phase of the frequency response can be further limited by transmitting only a predetermined number of samples. Accordingly, the amount of details to be transmitted for the CSI can be further reduced. The predetermined number of samples can be set to a fixed number or the number of samples can be dynamically adapted.

In a further implementation form of the first aspect, the apparatus according to the first aspect is configured to receive at least one signaling message for requesting a reporting of feedback messages for the CSI estimation. The determination of the frequency response across the predetermined bandwidth of the channel between the first antenna and the second antenna and/or the sampling of the phase of the determined frequency response is performed based on the at least one received signaling message.

By providing the feedback message only in response to a received signaling message, CSI related information are only determined and transmitted on demand. In this way, the communication channels can be further relieved. Further, the computational load for determining CSI can be reduced.

In a further implementation form of the first aspect, the apparatus is configured to adapt dynamically the number of samples of the phase of the determined frequency response on the basis of a variation of a channel state.

By limiting the number of samples to a subset, the amount of data to be transmitted can be further reduced. In addition, by dynamically adapting the number of samples, it is possible to adapt the CSI depending on the current system requirements.

In a further implementation form of the first aspect, the apparatus is configured to adapt dynamically the number of samples of the phase of the determined frequency response on the basis of at least one of a static or time-variant error requirement, a quality indicator, or a performance constraint.

Thereby, the number of samples and consequently, the amount of data to be transmitted for the CSI can be adapted in compliance with current system requirements.

In a further implementation form of the first aspect, the apparatus is configured to send a second feedback message including information about the frequencies associated with the samples of the phase of the determined frequency response.

Thereby, a reliable and high quality construction of the CSI can be achieved.

In a further implementation form of the first aspect, the apparatus is configured to send a third feedback message including a 1-bit message, if a difference between the determined frequency response and a previously determined frequency response is less than a predetermined threshold.

Thereby, the size of the feedback message can be further reduced in case that no or only a very small change in the channel state occurs.

In a further implementation form of the first aspect, the apparatus is or is located in the first device. Preferably, the first device is a user equipment (UE).

Thereby, a user equipment (UE) can provide CSI regarding an indication channel in an efficient manner.

According to a second aspect, the present application provides an apparatus for determining a channel state information (CSI) with respect to a channel between a first antenna of a first device and a second antenna of a second device. The apparatus is configured to receive a feedback message including at least information of samples of a phase of a frequency response across a predetermined bandwidth of the channel between the first antenna and the second antenna, and determine an estimated CSI from the received samples of the phase of the frequency response.

Thereby, it is possible to determine an estimation of a CSI on the basis of a feedback message including a small amount of data. In this way, the load of a communication channel for providing CSI data can be reduced. In particular, the CSI of a channel can be determined or estimated on the basis of the phase of a frequency response. Because the phase of the frequency response is sufficient for estimating the CSI, the amount of data to be transmitted in the feedback message can be limited to the phase and consequently, the amount of data and the feedback message can be reduced.

In a further implementation form of the second aspect, the apparatus according to the second aspect is configured to acquire at least one channel parameter related to the channel between the first antenna and the second antenna, and send at least one signaling message for requesting the CSI if the acquired channel parameter satisfies at least one predetermined control condition.

By providing a signaling message for requesting of the CSI, the transfer of data for determining a CSI estimation can be further limited. In this way, the load of the communication channel for providing CSI data can be further reduced.

In a further implementation form of the second aspect, the apparatus is configured to acquire the at least one channel parameter periodically, and send the at least one signaling message if a difference between consecutive acquired channel parameters satisfies at least one predetermined control condition.

Thereby, additional data for requesting and transmitting the CSI data can be further limited. In particular, it is possible to transfer further details regarding the CSI only to such cases when the CSI is expected to be changed.

In a further implementation form of the second aspect, the apparatus is configured to send at least one signaling message including an indication of at least one frequency for which the CSI is to be determined.

Thereby, it is possible to request only CSI data for one or more desired frequencies. Accordingly, the amount of data to be transmitted can be further reduced.

In a further implementation form of the second aspect, the apparatus is configured to send at least one signaling message including an indication of a device for reporting feedback messages for CSI estimation.

Thereby, it is possible to identify a particular device for providing CSI data.

In a further implementation form of the second aspect, the apparatus is configured to determine an estimated CSI based on a linear or non-linear interpolation of the received samples of the phase of the frequency response.

Thereby, the received samples of the phase of the frequency response, the frequency response over a desired frequency band can be reconstructed or estimated in a smart and efficient manner. In particular, an estimated frequency response can be determined over the desired bandwidth by a small number of samples.

In a further implementation form of the second aspect, the apparatus according to the second aspect is configured to identify and execute a signal processing strategy based on the determined CSI. The signal processing strategy is used for processing signals to be transmitted from the first antenna towards the second antenna.

Thereby, the signal processing can be easily adapted in respect to the determined CSI. In this way, the signal processing can be set up to order respective radio-frequency conditions.

In a further implementation form of the second aspect, the apparatus is or is located in the second device. Preferably the second device is a base station (BS).

Thereby, the base station (BS) can obtain the determine CSI in an efficient and reliable manner.

According to a third aspect, the present application provides a wireless communication system including at least the apparatus of the first aspect and the apparatus of the second aspect. The first device is a user equipment (UE) and the second device is a base station (BS).

Thereby, data exchange between the base station and a user equipment for obtaining CSI can be performed in an efficient manner requiring only a reduced amount of data.

According to a fourth aspect, the present application provides a method for reporting feedback messages for channel state information (CSI) estimation with respect to a channel between a first antenna of a first device and a second antenna of a second device. The method includes determining a frequency response across a predetermined bandwidth of a channel between a first antenna of a first device and a second antenna of a second device, sampling a phase of the determined frequency response in order to obtain a number of samples of the phase of the determined frequency response, and sending at least a first feedback message including information of at least a subset of the obtained samples.

In a further implementation form of the fourth aspect, the method includes receiving at least one signaling message for requesting a reporting of the CSI.

In a further implementation form of the fourth aspect, determining a frequency response across a predetermined bandwidth of the channel between the first antenna and the second antenna includes computing an estimation or an approximation of the frequency response across the predetermined bandwidth.

Thereby, the frequency response can be estimated in a smart and efficient manner. The predetermined bandwidth can be set up depending on the current system requirements. In particular, the predetermined bandwidth can be a fixed bandwidth or a bandwidth that is adapted dynamically.

According to a fifth aspect, the present application provides a method for determining a channel state information (CSI) with respect to a channel between a first antenna of a first device and a second antenna of a second device. The method includes receiving at least one feedback message including information of samples of a phase of a frequency response across a predetermined bandwidth of the channel between the first antenna and the second antenna, and determining an estimated CSI from the received samples of the phase of the frequency response.

In a further implementation form of the fifth aspect, the method includes acquiring at least one channel parameter related to the channel between the first antenna and the second antenna, and sending at least one signaling message for requesting the CSI if the acquired channel parameter satisfies at least one predetermined control condition.

In a further implementation form of the fifth aspect, the method includes determining an estimated CSI from the received samples of the phase of the frequency response by a linear or non-linear interpolation of the received samples of the phase of the frequency response.

By applying a linear or non-linear interpolation of the received samples of the phase of the frequency response, the frequency response over a desired frequency band can be reconstructed or estimated in a smart and efficient manner.

According to an sixth aspect, the present application provides a computer program including a program code for performing the method according to any one of the fourth aspect, the implementation forms of the fourth aspect, the fifth aspect and the implementation forms of the fifth aspect, when executed on a computer.

Thereby, the method can be performed in an automatic and repeatable manner.

The computer program can be performed by any one of the above apparatuses.

More specifically, it should be noted that all the above apparatuses may be implemented based on a discrete hardware circuitry with discrete hardware components, integrated chips or arrangements of chip modules, or based on a signal processing device or chip controlled by a software routine or program stored in a memory, written on a computer-readable medium or downloaded from a network such as the Internet.

These and other aspects of the invention will be apparent and elucidated with reference to the exemplary embodiments described hereinafter.

BRIEF DESCRIPTION OF THE DRAWINGS

In the following detailed portion of the present disclosure, the present invention will be explained in more detail with reference to the exemplary embodiments shown in the drawings, in which.

DETAILED DESCRIPTION

Figure 1:
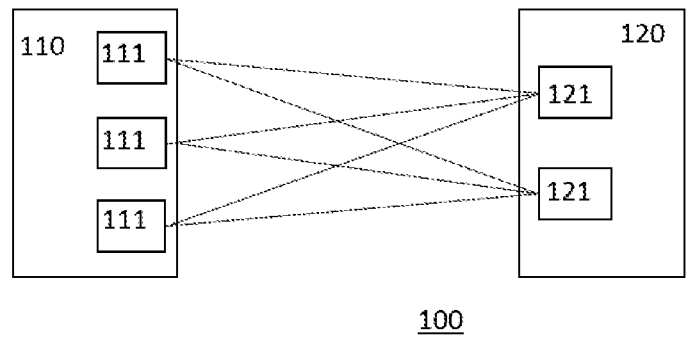
FIG. 1 shows a wireless communication system in a multiple-input multiple-output configuration according to an exemplary embodiment of the present invention.

FIG. 1 shows a communication system 100 in a multiple-input multiple-output (MIMO) configuration according to an exemplary embodiment of the present invention.

The communication system 100 includes at least one base station (BS) 110 and at least one user equipment (UE) 120. The BS 110 includes multiple antennas 111. The UE 120 includes one or more antennas 121. Accordingly, a communication channel can be established between each combination of an antenna 111 of the BS 110 and an antenna 121 of the UE 120.

In the following, a downlink of the communication system 100 is considered, in which an N-antenna BS 110 serves K UE 120. M is the total number of antennas 121 over all the UE 120, H denotes a (M x N) downlink channel matrix concatenated over all the UE 120. P is a precoding matrix. Conceptually, when the BS 110 has the full knowledge of H, the precoding matrix is obtained by adopting the well-known Zero Forcing and Regularized Zero Forcing strategies, as follows:

Zero Forcing: $P=H^H(HH^H)^{-1}$ (1)

Regularized Zero Forcing: $P=H^H(HH^H+\rho I)^{-1}$ (2)

where $\rho$ is the regularization factor, usually given as:

$$\rho = \frac{K}{P_{tx}/\sigma^2} \quad (3)$$

with $P_{tx}$ defined as the BS 110 transmits power and $\sigma^2$ as the average noise power at each UE 120.

Acquiring information on the full matrix H at the BS is hardly feasible in practical FDD massive MIMO systems. An insight of the present application starts from this observation to devise a strategy that allows the BS to obtain meaningful information about H and significantly reduces the necessary redundancy to acquire this information as compared to legacy approaches.

With the phase matrix $\Phi=e^{j\angle H}$ and the amplitude matrix $A=|H|$, where $\angle H$ and $|H|$ are element-wise operators that return the phase and the amplitude of each element of H, respectively, the channel matrix H can then be rewritten as:

$H = A \odot \Phi$ (4)

where $\odot$ is the element-wise product (Schur-product).

The information on the channel phase fully characterizes the potential constructive/destructive interactions of the channel paths for both single user and multi-user cases. Additionally, the channel phase is more regular than the channel amplitude and, more importantly, varies much slower than the channel gain. Thus, it is possible to use the phase matrix $\Phi$ in place of H for the design of the precoding matrix P.

If linear precoding strategies such as zero-forcing (ZF) or regularized zero-forcing (RZF) are taken as a reference, the corresponding precoding matrix P can be computed as:

Phase-based ZF: $P=\Phi^H(\Phi\Phi^H)^{-1}$ (5)

Phase-based RZF: $P=\Phi^H(\Phi\Phi^H+\rho I)^{-1}$ (6)

The channel phase of a single or multi-path channel can be acquired in order to leverage the potential of a phase-based precoding. The so-called channel phase is the phase ramp due to the path delays. In other words, the channel phase is responsible for the rotations experienced by the transmitted signals in the complex plane. The phase ramp of a channel path usually is linear over the frequency, i.e., the channel phase at the l-th subcarrier can be written as:

$$\phi_p(l) = \frac{2\pi\tau_p}{N_{FFT}}l \quad (7)$$

where $\phi_P$ is the phase, $\tau_P$ is the delay of the p-th path and $N_{FFT}$ is the number of sub-carriers used in the considered system. In the particular case of a multi-path channel, the channel phase is given by the combination of the individual linear phase ramps associated to each of the paths.

The solution proposed here allows to efficiently acquire the channel phase of a single or multi-path channel in order to leverage the potential of the proposed phase-based precoding.

The linearity of the channel phase across the channel bandwidth is almost completely preserved and can be well fitted by a piecewise linear function. This allows for the definition of method for reporting the information about the phase of the frequency response to one or a plurality of devices and obtaining the information about the phase of the frequency response of one or a plurality of channels as described in the following embodiments.

Figure 2:
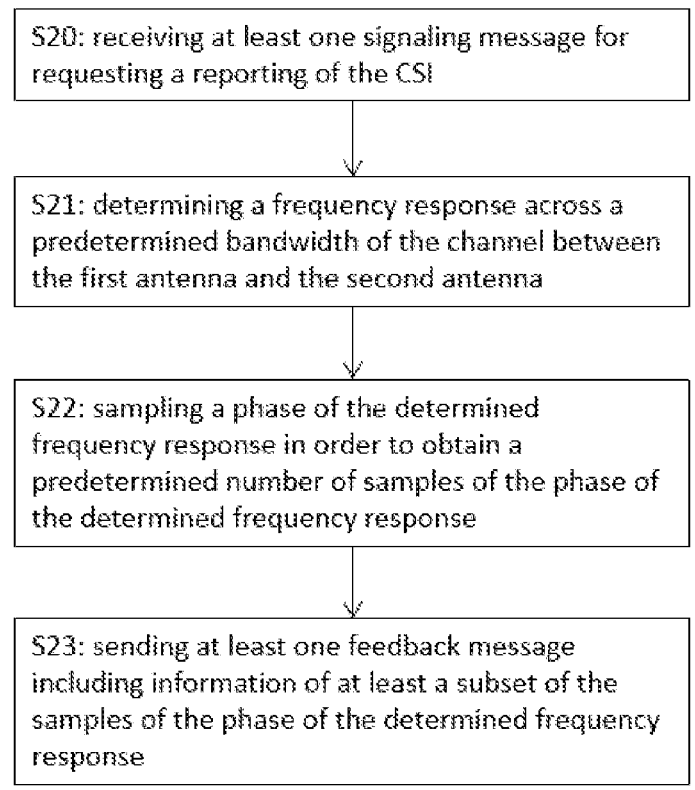
FIG. 2 shows a flow diagram of a method for reporting CSI according to an exemplary embodiment of the present invention.

FIG. 2 shows a flow diagram for reporting a feedback message according to an exemplary embodiment of the present invention.

Optionally, at step S20, a signaling message may be received. The received signaling message may imitate a request of reporting of the CSI. However, any other way for initiating reporting of CSI may be possible too.

At step S21, a frequency response across a predetermined bandwidth of a channel between the first antenna of a first device and the second antenna of a second device is determined. The determination of the frequency response can be performed by any conventional channel estimation technique.

The determining of a frequency response may be based on measurement data relating to the respective channel. Alternatively or additionally, the determining of a frequency response may include computing an estimation or an approximation of the frequency response across the predetermined bandwidth. In this way, the frequency response can be determined based on only a minimum number of measurements.

The predetermined bandwidth of the channel can be set to a fixed bandwidth. Alternatively, the predetermined bandwidth can be dynamically adapted depending on current system requirements.

At step S22, a phase of the frequency response, which has been determined at step S21, is sampled. In this way, a number of samples of the phase of the determined frequency response is obtained.

At step S23, a first feedback message is sent. The feedback message includes information of all or at least a subset of the samples of the phase of the frequency response. The sending of a feedback message at step S23 is not limited to only a single feedback message. Moreover, it is also possible to send multiple feedback messages to multiple receivers or a common feedback message to multiple receivers.

Figure 3:
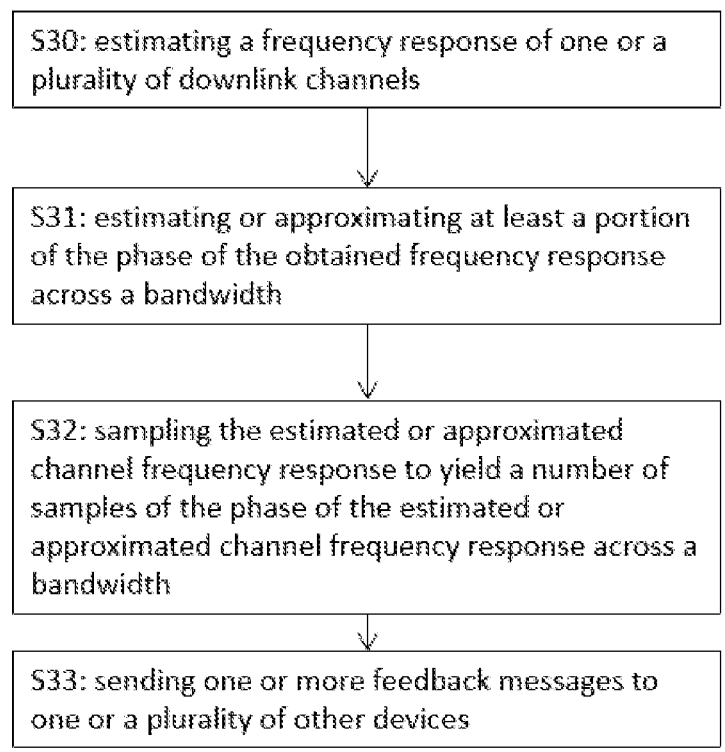
FIG. 3 shows a flow diagram of a method for reporting CSI according to a further exemplary embodiment of the present invention.

FIG. 3 shows a flow diagram for reporting a feedback message related to channel state information (CSI) according to a further exemplary embodiment of the present invention.

At step S30, a device (i.e., an apparatus), for instance a user equipment (UE), estimates a frequency response of one or a plurality of downlink channels. The determination of the frequency response can be performed by means of any conventional channel estimation technique.

At step S31, the device subsequently estimates or approximates at least a portion of the phase of the obtained frequency response across a bandwidth. The estimation or approximation can be performed, for example, by a piecewise linear function.

At step S32, the device samples the estimated or approximated channel frequency response to yield a number S≥0 of samples of the phase of the estimated or approximated channel frequency response across a bandwidth.

At step S33, the device sends one or more feedback messages to one or a plurality of other devices. The other devices may be, for instance a base station (BS). Each feedback message carries information about at least S'≤S samples of the phase of the estimated or approximated channel frequency response across a predetermined bandwidth.

In particular, the steps S30 to S33 can be included in a larger procedure, which accounts for interactions between the devices aiming at optimizing the performance of the system in terms of reduction in redundancy for the CSI reporting overhead.

Figure 4:
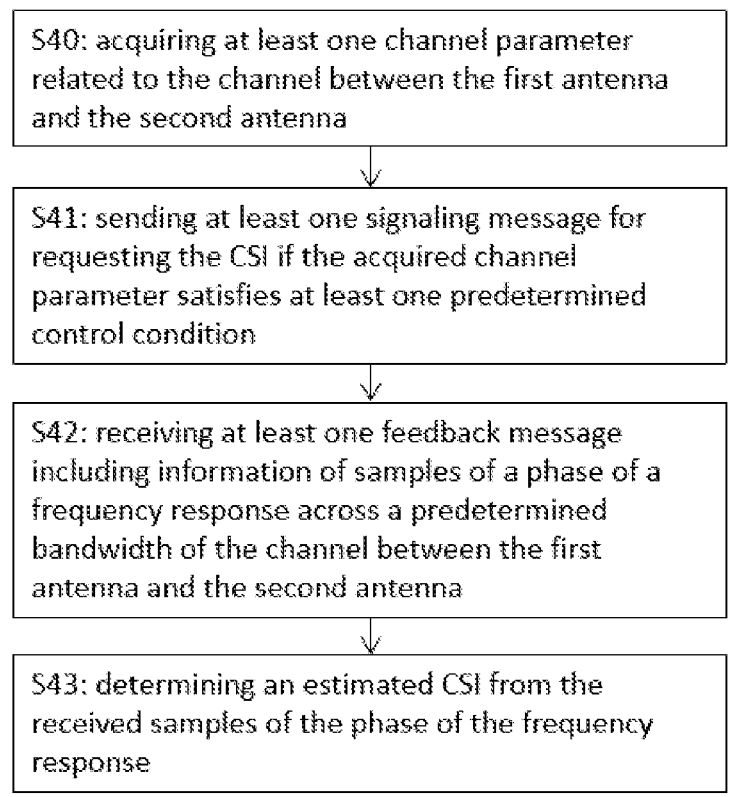
FIG. 4 shows a flow diagram of a method for acquiring CSI according to an exemplary embodiment of the present invention.

FIG. 4 shows a flow diagram acquiring a channel state information (CSI) according to an exemplary embodiment of the present invention.

At step S42, one or more feedback messages are received. Each feedback message includes information of samples of a phase of a frequency response across a predetermined bandwidth of a channel between the first antenna of a first device and the second antenna of a second device.

At step S43, an estimated CSI from the received samples of the phase of the frequency response is determined.

The determination of an estimated CSI may include a linear or non-linear interpolation of the received samples of the phase of the frequency response.

Optionally, the method may include a step S40 for acquiring one or more channel parameters. The acquired channel parameters related to the channel between the first antenna and the second antenna. At step S41, one or more signaling messages may be sent for requesting the CSI if the acquired channel parameters satisfy one or more predetermined control conditions.

Figure 5A:
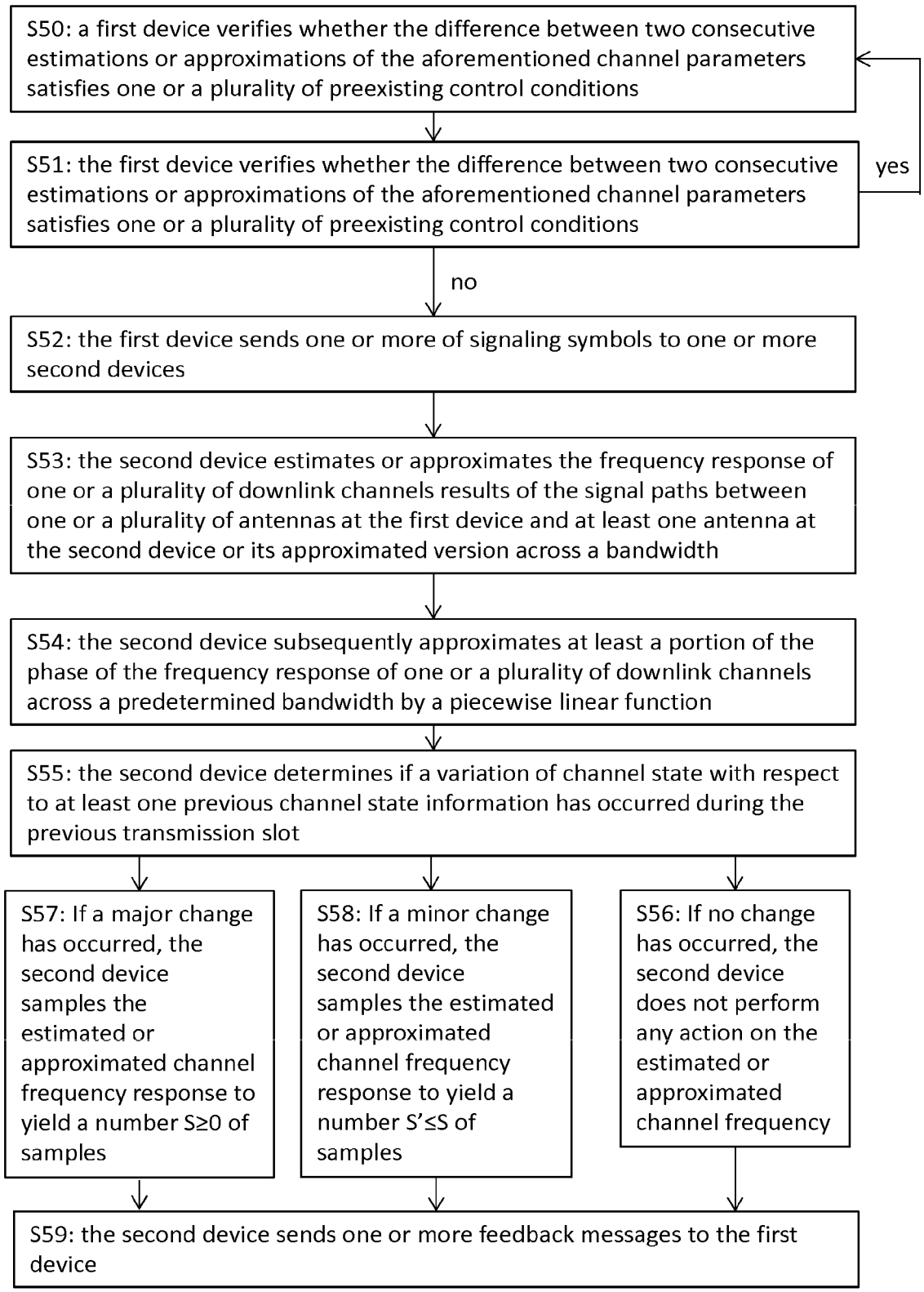
FIGS. 5a, 5b respectively show a flow diagram and a flow graph of a method for acquiring CSI according to a further exemplary embodiment of the present invention.
Figure 5B:
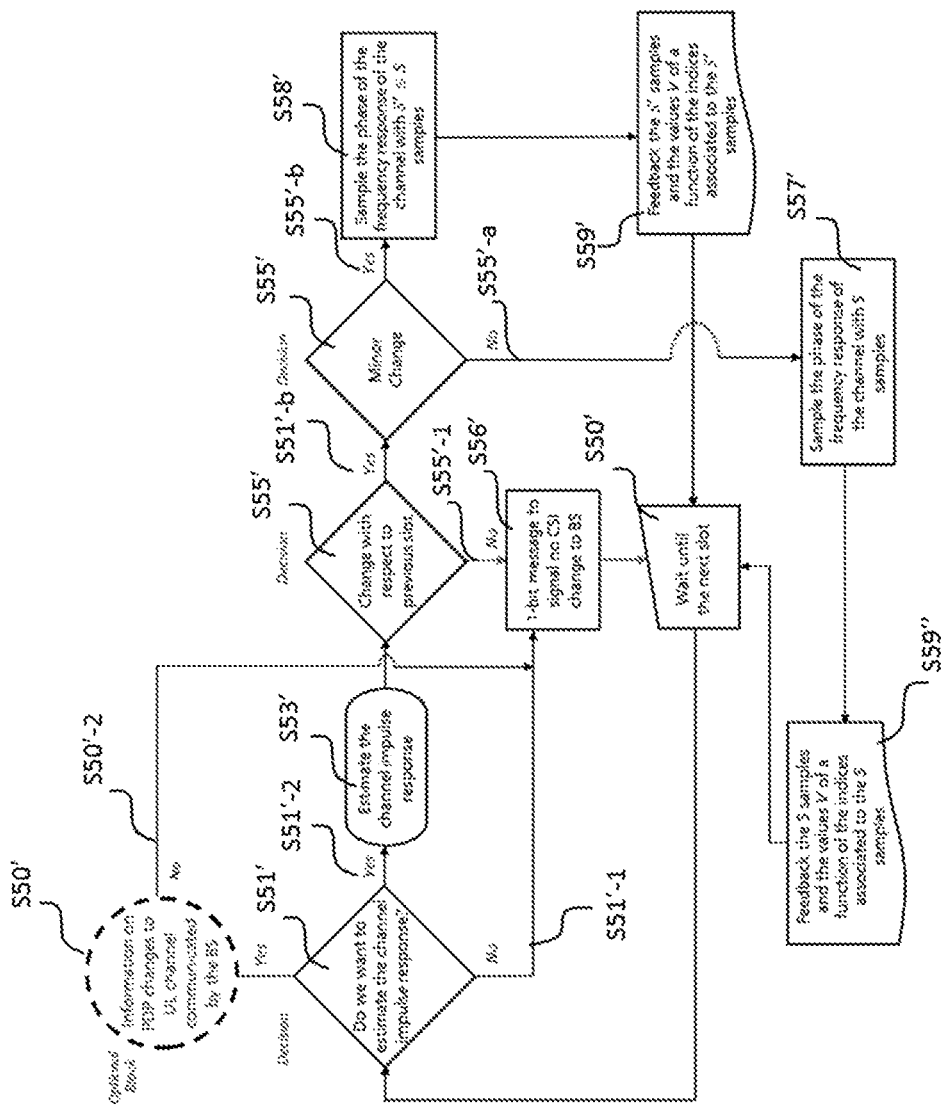

FIGS. 5a, 5b respectively show a flow diagram and a flow graph depicting the steps performed by the first and the second devices for acquiring a channel state information (CSI) according to a further exemplary embodiment of the present invention. Reference numerals indicated with (.') in FIG. 5b corresponds to reference numerals (.) in FIG. 5a, and depicts the same method steps.

At step S50 (S50'), a first device, for instance, a base station (BS), estimates or approximates one or a plurality of parameters. These parameters may include, e.g., a power delay profile (PDP), characterizing the uplink channels between one or more second devices, e.g. between a UE and the first device. The estimation or approximation is carried out with a periodicity of at least one transmission slot.

At step S51 (S51'), the first device checks whether the channel impulse response should be estimated, that it, the device verifies whether the difference between two consecutive estimations or approximations of the aforementioned channel parameters satisfies one or a plurality of preexisting control conditions. The control conditions may include, for example, a comparison with one or more predetermined threshold values of a comparison with a previously acquired parameter.

Depending on this verification at step S51 (S51'), the first device performs one of the following two actions:

If the difference between two consecutive estimations or approximations of one or more channel parameters does not satisfy any of the preexisting control conditions (S51'-1), then the first device waits until the next transmission slot and returns to step S50.

If the difference between two consecutive estimations or approximations of one or more channel parameters satisfies one or more of preexisting control conditions (S51'-2), then the first device sends at step S52 one or more of signaling symbols to one or more second devices, such as UEs.

The one or more signaling symbols sent by the first device may inform the second devices about at least one change occurred in the uplink channel with respect to the previous estimation. In this case, at step S53 (S53'), the second device estimates or approximates the frequency response of one or a plurality of downlink channels results of the signal paths between one or a plurality of antennas at the first device and at least one antenna at the second device or its approximated version across a bandwidth.

At step S54, the second device subsequently approximates at least a portion of the phase of the frequency response of one or a plurality of downlink channels across a predetermined bandwidth by a piecewise linear function.

At step S55 (S55'), the second device determines whether a variation of channel state with respect to at least one previous channel state information (CSI), e.g., during the previous transmission slot, has occurred. Depending on this determination, the second device performs one of the following three actions:

If no change has occurred (S55'-1), the second device branches to step S56 (S56') and does not perform any action on the estimated or approximated channel frequency response until the next slot (S50').

If a major change has occurred (branch S55'-a in FIG. 5b), the second device branches to step S57 (S57') and samples the estimated or approximated channel frequency response to yield a number S≥0 of samples of the phase of the channel frequency response, or its approximated version, across a bandwidth.

If a minor change (S55'-b) has occurred, the second device branches to step S58 (S58') and samples the estimated or approximated channel frequency response to yield a number S'≤S samples of the phase of the channel frequency response, or its approximated version, across a bandwidth.

At step S59 (S59'), the second device sends one or more feedback messages to the first device. The nature of the feedback messages depends on the decisions made at step S55 (S55'). In particular, the messages may contain the following information:

If no change has occurred in the channel frequency response with respect to a previous slot, the feedback message may include a 1-bit message S56', or any other kind of information to inform the first device that no change has occurred in the channel frequency response with respect to a previous slot.

Alternatively, if a major change has occurred, the feedback message may include at least a raw or quantized version of the S samples of the phase of the channel frequency response. Additional information can be a set I of the I≤S indices of one or more frequencies associated to one or more of the S samples, a set V of the V≤S values associated to one or more of the I≤S indices of one or more frequencies corresponding to one or more of the S samples of the phase of the channel frequency response, and obtained as the value of a linear or non-linear function of the indices, that is f: I→V.

If a minor change has occurred, the feedback message may include at least a raw or quantized version of the S' samples of the phase of the channel frequency response. Additional information can be a set I of the I≤S' indices of one or more frequencies associated to one or more of the S' samples, a set V of the V≤S' values associated to one or more of the I≤S' indices of one or more frequencies corresponding to one or more of the S' samples of the phase of the channel frequency response, and obtained as the value of a linear or non-linear function of the indices, that is f: I→V.

Finally, the first device operates on a set of symbols received by at least one second device and carrying at least information on the phase of the channel frequency response with respect to the signal paths between one or a plurality of antennas at the first device and at least one antenna at one or more second devices, or its approximated version across a bandwidth, to determine the related approximated channel state information (CSI). This information can be used to design suitable signal processing strategies to process the signal to be transmitted to the second devices, e.g., precoders.

Figure 6:
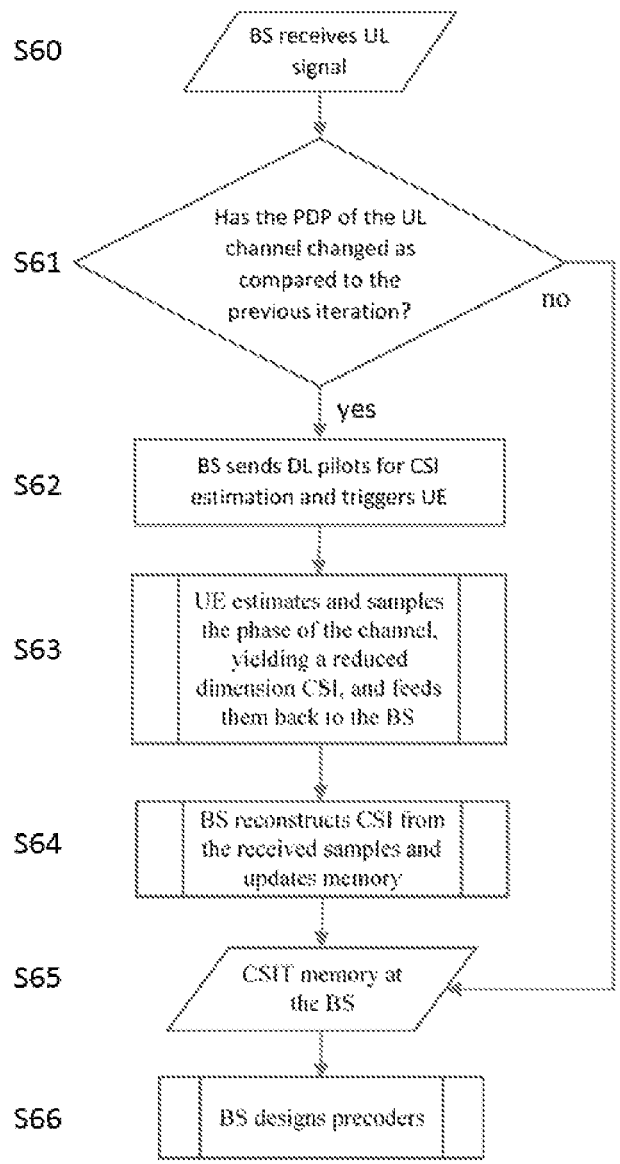
FIG. 6 shows a flow diagram of an operation performed by a BS and a UE according to an exemplary embodiment of the present invention.

FIG. 6 shows a flow diagram of operations performed by the BS 110 and the UE120 according to an exemplary embodiment of the present invention.

At step S60, the BS 110 receives an uplink (UL) signal. The UL signal may be an UL signal sent by the BS 120. For example, the UL signal may be an UL signal of a conventional data transmission.

At step S61 the BS 120 verifies whether a power delay profile (PDP) has changed compared to a previous iteration. For example, a PDP may be compared with a PDP that has been determined in a previous time slot. Further to a PDP it may be also possible to analyze one or more other parameters characterizing an uplink channel between the BS 110 and an UE 120.

If the PDP—or another characterizing parameter—has not changed or at least has changed less than a predetermined threshold, the procedure may branch to step S65.

If the PDP—or another characterizing parameter—has not changed, the BS 110 sends one or more downlink (DL) pilots to the UE 120 in order to initiate a CSI estimation and to trigger the respective operations in the UE 120 at step S62.

In response to the received pilots sent by the BS 110, at step S63, the UE 120 estimates and samples the phase of the channel. This yields to a feedback message including information related to CSI, where the dimension of the information in the feedback message is reduced compared to the CSI. The feedback message, which is generated by the UE 120 is feed back to the BS 110.

At step S64, the BS 110 reconstructs (determines) the CSI from the received samples included in the feedback message. Accordingly, the BS 110 updated the respective information in the memory of the BS 110.

At step S65, the CSI at the transmitter side (CSIT) are available in the memory of the BS 110. Accordingly, the BS 110 can access to the current CSIT.

Based on the current CSIT, the BS 110 designs the precoders for precoding the data at step S66.

Figure 7:
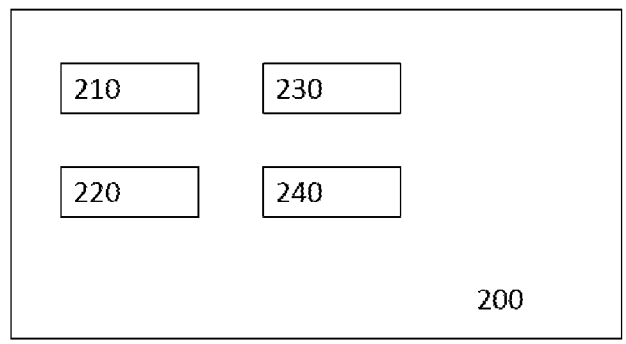
FIG. 7 shows a flow diagram of an apparatus for reporting CSI according to an exemplary embodiment of the present invention.
Figure 8:
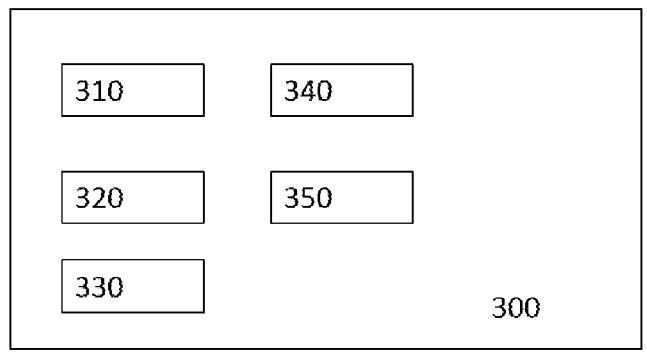
FIG. 8 shows a flow diagram of an apparatus for acquiring CSI according to an exemplary embodiment of the present invention.

FIG. 7 shows an apparatus 200 for reporting a feedback according to an exemplary embodiment of the present invention.

For instance, the apparatus 200 may be included in a device such as a UE 120 in a communication system according to FIG. 1. In this way, a feedback message related to channel state information (CSI) can be reported with respect to a channel between a first antenna 111 of a first device 110 and a second antenna 121 of a second device 120.

The apparatus 200 includes at least a determining module 210, a sampling module 220, and a sending module 230.

The determining module 210 determines a frequency response across a predetermined bandwidth of the channel between the first antenna 111 of the first device 110 and the second antenna 121 of the second device 120. The determination of the frequency response can be performed, for instance, by any conventional technique. The bandwidth for determining the frequency response may be a fixed bandwidth. Alternatively, the bandwidth may be dynamically adapted depending on current communication settings.

The sampling module 220 samples a phase of the determined frequency response. In this way, a number of samples of the phase of the determined frequency response is obtained. The number of samples, which are sampled by the sampling module 220, may be a fixed value. However, it is also possible to adapt the number of samples dynamically. For instance, the number of samples may be adapted depending on further communication parameters.

The sending module 230 sends at least one feedback message to a further device. The feedback messages includes information of at least a subset of the samples of the phase of the determined frequency response.

Additionally, the apparatus 200 may further include a receiving module 240. The receiving module 240 receives at least one signaling message for requesting a reporting of the CSI. Accordingly, the determining module 210 determines the frequency response across the predetermined bandwidth of the channel between the first antenna 111 and the second antenna 121 and/or the sampling of the phase of the determined frequency response based on the received signaling message.

In particular, a different determination scheme may be applied depending on a degree of change as described above in the previous embodiment in connection with FIG. 5.

In particular, the feedback message may include information of at least a subset of samples. The subset of samples is dynamically adapted on the basis of a variation of a channel state. In particular, the sending module 230 may send at least one feedback message including information of at least a subset of samples. The sending module 230 may dynamically adapt the subset of samples on the basis of a variation of a channel state.

Further, the number of samples of the phase of the determined frequency response may be dynamically determined. For example, the number of samples may be adapted on the basis of a static error requirement, a time-variant error requirement, a quality indicator, or a performance constraint. In particular, the sampling module 240 may dynamically adapt the number of samples of the phase of the determined frequency response on the basis of at least one of a static or time-variant error requirement, a quality indicator, or a performance constraint.

The feedback message may further include information about the frequencies associated with the samples of the phase of the determined frequency response. Accordingly, each device, which is receiving the feedback message, may easily reconstruct (determine) CSI on the basis of the data included in the feedback message. In particular, the sending module 230 may send at least one feedback message including information about the frequencies associated with the samples of the phase of the determined frequency response.

Further, the sending module 230 may send at least one feedback message including a 1-bit message, if a current frequency response corresponds to a previous frequency response or a difference between the determined frequency response and a previously determined frequency response is less than a predetermined threshold. For example, the previous frequency response may be a frequency response that has been determined in a previous time slot, in particular, the time slot before the current time slot.

The predetermined threshold value for assessing the change of the frequency response may be a fixed threshold value that can be set in advance. Alternatively the threshold value may be dynamically adapted. For example, the threshold value may be adapted depending on a current operation mode or further parameters.

FIG. 7 shows an apparatus 300 for acquiring a channel state information (CSI) according to an exemplary embodiment of the present invention.

For instance, the apparatus 300 may be included in a device such as a BS 110 in a communication system according FIG. 1. In this way, a channel state information (CSI) can be acquired with respect to a channel between a first antenna 111 of a first device 110 and a second antenna 121 of a second device 120.

The apparatus 300 includes at least a receiver 310, and a reconstruction (determination) module 320.

The receiver 310 receives a feedback message from another device, for example, an apparatus 200 as described above in connection with FIG. 7. The feedback message incudes at least information of samples of a phase of a frequency response across a predetermined bandwidth of the channel between the first antenna 111 of the first device 110 and the second antenna 121 of the second device 120.

Based on the received samples of the phase of the frequency response, the reconstruction (determination) module 320 determines an estimated CSI. In particular, the determination module 320 may determine an estimated CSI based on a linear or non-linear interpolation of the received samples of the phase of the frequency response.

Further, the apparatus 300 may include an acquiring module 330 and a transmitter 340.

The acquiring module 330 may acquire at least one channel parameter related to the channel between the first antenna 111 and the second antenna 121. These parameters may include, e.g., a power delay profile (PDP), characterizing the uplink channels between one or more second devices, e.g. between a UE and the first device. The estimation or approximation is carried out with a periodicity of at least one transmission slot.

If the acquired channel parameter satisfies at least one predetermined control condition, the transmitter 340 may send at least one signaling message for requesting the CSI.

In particular, the acquiring module 330 acquires the at least one channel parameter periodically. In this case, the transmitter 340 may send the at least one signaling message only if a difference between consecutive acquired channel parameters satisfies at least one predetermined control condition. For example, such a control condition may be the same control condition as already explained in connection with the embodiment according FIG. 5.

In particular, the signaling message may include an indication of at least one frequency for which the CSI is to be acquired. Accordingly, an apparatus 200 for acquiring CSI may acquire the respective frequency response with respect to the indicated frequencies.

Further, the signaling message includes an indication of a device for reporting a CSI. Accordingly, the apparatus 300 can select an appropriate device, e.g. a UE, for acquiring CSI data and providing a respective feedback message.

Optionally, the apparatus 330 may further include a computing module 350. The computing module 350 may identify a signal processing strategy based on the determined CSI and execute the identified processing strategy. For example, one or more appropriate processing strategies may be stored in a memory of the apparatus 300. Based on the determined CSI, the computing module 350 may select and execute one of the stored processing strategies. In particular, the signal processing strategy is used for processing signals to be transmitted from the first antenna 111 towards the second antenna 121.

As described in detail above, an aspect of the present invention relates to an acquiring and reporting of data for estimating channel state information. A device, such as a user equipment, can determine a frequency response of a channel across a bandwidth and can generate at least one feedback message including samples of a phase of the determined frequency response. Accordingly, a further device, such as a base station, can receive the feedback message and can determine channel state information about a channel based on the samples included in the feedback message. In this way, the amount of data to be transmitted for obtaining channel state information can be reduced.

While the invention has been illustrated and described in detail in the drawings and the foregoing description, such illustration and description are to be considered illustrative or exemplary and not restrictive. The invention is not limited to the disclosed embodiments. From reading the present disclosure, other modifications will be apparent to a person skilled in the art. Such modifications may involve other features, which are already known in the art and may be used instead of or in addition to features already described herein.

The invention has been described in conjunction with various exemplary embodiments herein. However, other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable non-transitory medium, such as an optical storage medium or a solid-state medium supplied together with or as part of other hardware, but may also be distributed in other forms, such as via the Internet or other wired or wireless telecommunication systems.

Although the present invention has been described with reference to exemplary features and embodiments thereof, it is evident that various modifications and combinations can be made thereto without departing from the spirit and scope of the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. An apparatus for reporting feedback messages for channel state information (CSI) estimation with respect to a channel between a first antenna of a first device and a second antenna of a second device, the apparatus being configured to:
   determine a frequency response across a predetermined bandwidth of the channel between the first antenna and the second antenna;
   sample a phase of the determined frequency response to obtain a number of samples of the phase of the determined frequency response; and
   send at least a first feedback message of the feedback messages, the first feedback message comprising information of at least a subset of the obtained samples; and
   wherein the apparatus is further configured to dynamically adapt the number of samples of the phase of the determined frequency response on the basis of a variation of a channel state of the channel.

2. The apparatus of claim 1 being further configured to receive at least one signaling message for requesting the reporting of the feedback messages for the CSI estimation,
   wherein the determination of the frequency response across the predetermined bandwidth of the channel between the first antenna and the second antenna and/or the sampling of the phase of the determined frequency response is performed based on the at least one received signaling message.

3. The apparatus of claim 1 being further configured to dynamically adapt the number of samples of the phase of the determined frequency response on the basis of at least one of a static error requirement, a time-variant error requirement, a quality indicator, or a performance constraint.

4. The apparatus of claim 3 being further configured to send a second feedback message of the feedback messages, the second feedback message comprising information about the frequencies associated with the samples of the phase of the determined frequency response.

5. The apparatus of claim 1 being further configured to send a third feedback message of the feedback messages, the third feedback message comprising a 1-bit message, in a case where a difference between the determined frequency response and a previously determined frequency response is less than a predetermined threshold.

6. The apparatus according to claim 5, wherein the apparatus is comprised within the first device, which is user equipment.

7. An apparatus for determining a channel state information (CSI) with respect to a channel between a first antenna of a first device and a second antenna of a second device, the apparatus being configured to:
   acquire at least one channel parameter related to the channel between the first antenna and the second antenna; and
   send at least one signaling message for requesting a reporting of feedback messages, which comprise the feedback message, for CSI estimation, in a case where the acquired channel parameter satisfies at least one predetermined control condition; and
   receive a feedback message comprising at least information of samples of a phase of a frequency response across a predetermined bandwidth of the channel between the first antenna and the second antenna; and
   determine an estimated CSI from the received samples of the phase of the frequency response.

8. The apparatus of claim 7 being further configured to:
   acquire the at least one channel parameter periodically, and send the at least one signaling message, in a case where a difference between consecutive acquired channel parameters satisfies at least one predetermined control condition.

9. The apparatus of claim 8, wherein the apparatus is configured to send at least one signaling message comprising an indication of at least one frequency for which the CSI is to be determined.

10. The apparatus of claim 9 being further configured to send at least one signaling message comprising an indication of a device for reporting feedback messages for CSI estimation.

11. The apparatus of claim 7 being further configured to determine an estimated CSI based on a linear or non-linear interpolation of the received samples of the phase of the frequency response.

12. The apparatus of claim 7 being further configured to:
   identify and execute a signal processing strategy based on the determined CSI, wherein the signal processing strategy is used for processing signals to be transmitted from the first antenna towards the second antenna.

13. The apparatus according to claim 7, wherein the apparatus is comprised within the second device, which is a base station.

14. A method for reporting feedback messages for channel state information (CSI) estimation with respect to a channel between a first antenna of a first device and a second antenna of a second device, the method comprising:

determining a frequency response across a predetermined bandwidth of the channel between the first antenna and the second antenna;

sampling a phase of the determined frequency response in order to obtain a number of samples of the phase of the determined frequency response; and sending at least a first feedback message of the feedback messages, the first feedback message comprising information of at least a subset of the obtained samples of the phase of the determined frequency response; and dynamically adapting the number of samples of the phase of the determined frequency response on the basis of a variation of a channel state of the channel.

15. The method of claim 14, wherein the determining of the frequency response across the predetermined bandwidth of the channel between the first antenna and the second antenna comprises computing an estimation or an approximation of the frequency response across the predetermined bandwidth.

16. A non-transitory computer-readable medium comprising a computer program comprising a program code for performing the method according to claim 14 when executed on a computer.

17. A method for determining a channel state information (CSI) with respect to a channel between a first antenna of a first device and a second antenna of a second device, the method comprising:

acquiring at least one channel parameter related to the channel between the first antenna and the second antenna; and sending at least one signaling message for requesting the CSI in a case where the acquired channel parameter satisfies at least one predetermined control condition; and receiving at least one feedback message comprising information of samples of a phase of a frequency response across a predetermined bandwidth of the channel between the first antenna and the second antenna; and determining an estimated CSI from the received samples of the phase of the frequency response.

* * * * *